(12) United States Patent
Martini et al.

(10) Patent No.: US 9,072,139 B2
(45) Date of Patent: Jun. 30, 2015

(54) CURRENT DRIVER FOR LED DIODES

(71) Applicant: STMicroelectronics S.r.l., Agrate Brianza (IT)

(72) Inventors: Marco Martini, Acireale (IT); Salvatore Pantano, Pedara (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 14/154,367

(22) Filed: Jan. 14, 2014

(65) Prior Publication Data

US 2014/0197747 A1    Jul. 17, 2014

(30) Foreign Application Priority Data

Jan. 17, 2013   (IT) .............................. MI2013A0057

(51) Int. Cl.
    *H05B 33/08*    (2006.01)
    *H02M 1/36*    (2007.01)

(52) U.S. Cl.
    CPC ............. *H05B 33/0815* (2013.01); *H02M 1/36* (2013.01); *H05B 33/0812* (2013.01); *H05B 33/0848* (2013.01); *Y02B 20/343* (2013.01)

(58) Field of Classification Search
    None
    See application file for complete search history.

(56) References Cited

U.S. PATENT DOCUMENTS

| | | | | |
|---|---|---|---|---|
| 5,739,678 A * | 4/1998 | Nagaraj | ......................... | 323/268 |
| 7,071,905 B1 * | 7/2006 | Fan | .................... | 345/76 |
| 8,207,711 B2 * | 6/2012 | Crawford et al. | ............. | 323/207 |
| 8,237,693 B2 * | 8/2012 | Nishimura et al. | ........... | 345/204 |
| 8,373,348 B2 * | 2/2013 | Liu et al. | .................... | 315/209 R |
| 8,390,262 B2 * | 3/2013 | Chang et al. | ................... | 323/282 |
| 8,421,426 B2 * | 4/2013 | La Rosa et al. | ................ | 323/272 |
| 8,648,548 B2 * | 2/2014 | Sakai | ............................ | 315/307 |
| 2011/0018509 A1 | 1/2011 | Tseng et al. | | |
| 2013/0009621 A1 | 1/2013 | Chen | | |

OTHER PUBLICATIONS

Italian Search Report and Written Opinion for IT MI2013A000057 mailed Sep. 4, 2013 (8 pages).

* cited by examiner

*Primary Examiner* — Jason M Crawford
*Assistant Examiner* — Nelson Correa
(74) *Attorney, Agent, or Firm* — Gardere Wynne Sewell LLP

(57) ABSTRACT

A current driver for a string of LEDs includes a first series connection of a first transistor and a first resistance and a second series connection of a second transistor and a second resistance. The first and second series connections are coupled in parallel between the string of LEDs and a voltage reference. An operational amplifier selectively drives the first and second transistors in response to a clock signal. A switch device driven by the clock signal alternately applies a reference voltage and a respective one of the voltages across the first and second resistances to inverting and non-inverting inputs of the operational amplifier in response to the clock signal. A storage circuit is coupled to the output of the operational amplifier to store the drive signals for the first and second transistors for application to the first and second transistors in the absence of output from the operational amplifier.

14 Claims, 4 Drawing Sheets

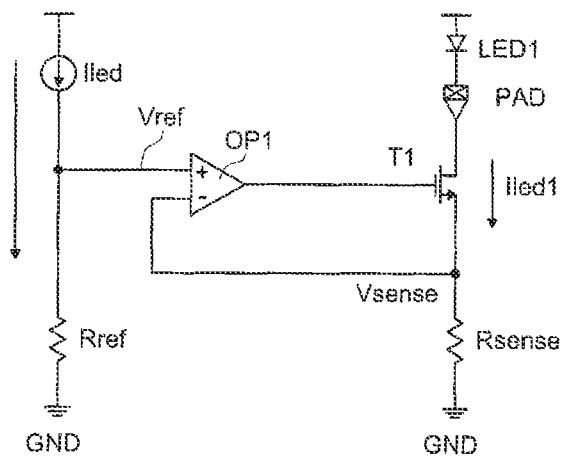
Fig.1    (PRIOR ART)
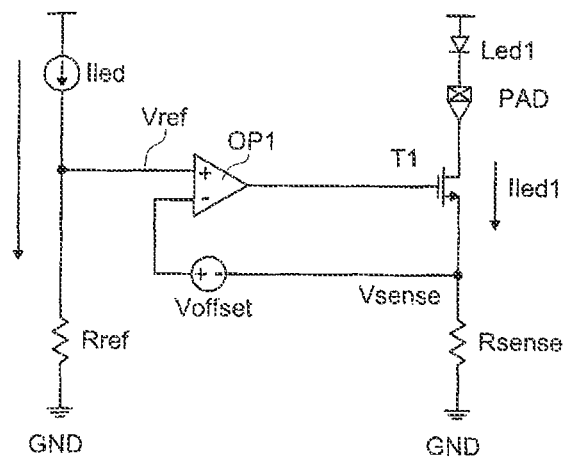
Fig.2    (PRIOR ART)

US 9,072,139 B2

CURRENT DRIVER FOR LED DIODES

PRIORITY CLAIM

This application claims priority from Italian Application for Patent No. MI2013A000057 filed Jan. 17, 2013, the disclosure of which is incorporated by reference.

TECHNICAL FIELD

The present disclosure relates to a current driver for LED diodes.

BACKGROUND

It is known in the state of the art for the use of LED array driver devices in applications like displays, information and advertising panels, traffic signals, automotive lighting.

One of the most important parameters for these devices is the current accuracy among all the channels of the array; the parameter that mainly affects this accuracy is the OFFSET of the OPAMP used in the control loop of the drivers.

FIG. 1 shows a prior art current driver for a LED diode wherein a current generator Iled flows through a resistance Rref connected to ground GND. An operational amplifier OP1 drives by means of its output the gate terminal of a MOS transistor T1 having the source terminals coupled to ground GND by means of a resistance Rsense and the drain terminal connected to the output pad PAD; the output pad Pad is connected to at least one LED diode LED1 wherein a current Iled1 flows. The non-inverting input terminal of the operational amplifier OP1 is connected to the common terminal of the current generator Iled and the resistance Rref, while the inverting terminal is connected to the source terminal of the MOS transistor T1.

The operational amplifier OP1 must make the voltage Vsense across the resistance Rsense equal to the voltage Vref across the resistance Rref. Of course in real circuits these voltages are not identical because of the offset voltage of the operational amplifier.

FIG. 2 shows the circuit in FIG. 1 but wherein the effect of the offset voltage is taken into account. Here a real operational amplifier is modeled with an ideal operational amplifier with a voltage source in one of its inputs, representing the offset voltage Voffset; more precisely the offset voltage Voffset is arranged at the inverting terminal of the operational amplifier OP1. In this case:

$$Vsense = Vref - Voffset,$$

since $$Iled = \frac{Vsense}{Rsense}$$

and considering also that the voltage Voffset could have also the opposite polarity, in general:

$$Iled1 = \frac{Vref}{Rsense} \pm \frac{Voffset}{Rsense}$$

The accuracy of the current Iled1 increases by reducing the offset voltage.

Typical LED array driver devices have a channel to channel current accuracy better than 3%. By reducing the offset voltage from 5 mV to few microvolts, the estimated channel to channel accuracy will be better than 1%.

SUMMARY

One aspect of the present disclosure is to provide a current driver for LED diodes with an increase of the current accuracy.

One aspect of the present disclosure is a current driver for at least one LED diode comprising: a first series of a first transistor and a first resistance and a second series of a second transistor and a second resistance, said first and second series being arranged in parallel to each other along an electric path between the at least one LED diode and a voltage reference, an operational amplifier and a switch device driven by a clock signal and able to apply to the non-inverting input terminal and the inverting input terminal of the operational amplifier alternately a reference voltage and the voltage across the first resistance or the voltage across the second resistance according to an half-period of the clock signal, said switch device being configured to apply the output signal of the operational amplifier alternately to the first or second transistor according to the half-period of the clock signal, a storage element being arranged to maintain turned on the first or the second transistor when not driven by the output signal of the operational amplifier.

BRIEF DESCRIPTION OF THE DRAWINGS

For a better understanding of the present invention, a preferred embodiment thereof is now described, purely by way of non-limiting example and with reference to the annexed drawings, wherein:

FIG. 1 shows a current driver for LED diodes according to prior art;

FIG. 2 shows the circuit in FIG. 1 wherein the effect of the OFFSET voltage is taken into account;

DETAILED DESCRIPTION OF THE DRAWINGS

Figure 3:
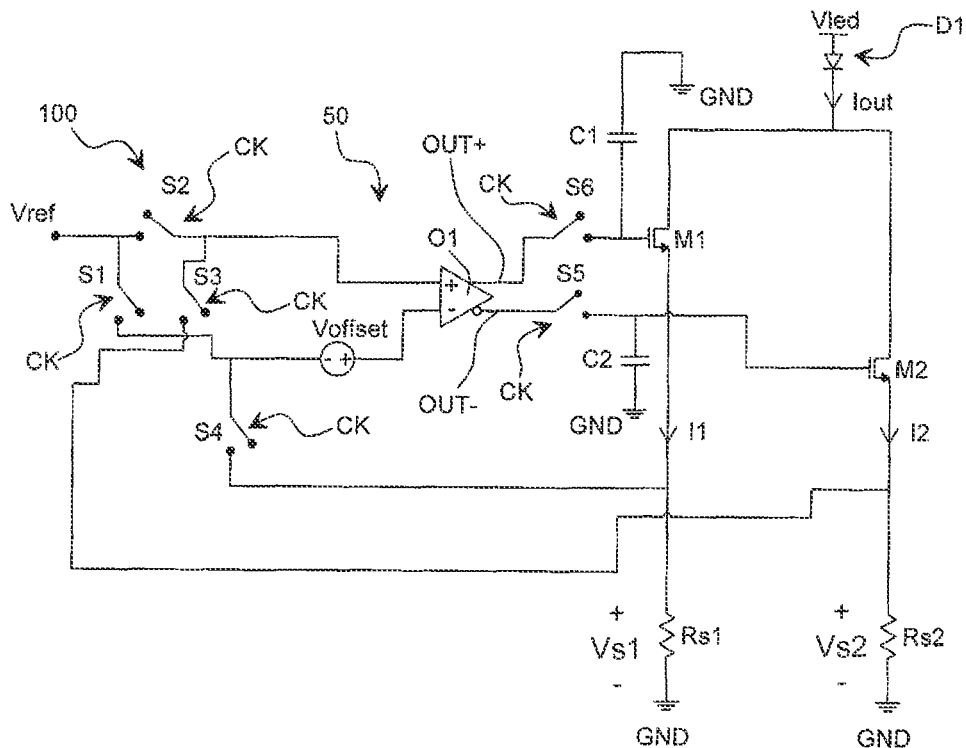
FIG. 3 shows a current driver for LED diodes according to the present disclosure.

FIG. 3 shows the current driver for an LED diode according to the present disclosure. The current driver in FIG. 3 uses a chopping technique to compensate the offset voltage of the operational amplifier.

The chopping technique is known by the article of C. Enz et al. "A CMOS Chopper Amplifier", IEEE journal of Solid-State Circuits, vol. sc-22, No. 3, June 1987 and the article of Tao Yin et al. "Noise Analysis and Simulation of Chopper Amplifier", Circuits and Systems, APCCAS 2006, IEEE Asia Pacific Conference on 4-7 Dec. 2006, pages 167-170 (the disclosures of each of which being incorporated by reference).

The chopping technique consists of using a so called chopper clock to exchange the input voltages at the inverting and non-inverting input terminals of an operational amplifier by means of switches. With this technique the offset voltage of the operational amplifier acts on both the input terminals of the operational amplifier according to the phase of the chopper clock.

The current driver for at least one LED diode D1 comprises a first series of a first transistor M1, preferably an NMOS transistor, and a first resistance Rs1 and a second series of a second transistor M2, preferably an NMOS transistor, and a second resistance Rs2; said first and second series being arranged in parallel to each other along an electric path between the at least one LED diode D1 and ground GND; the at least one LED diode D1 is connected to the supply voltage Vled.

The current driver comprises a control device 50 comprising an operational amplifier O1, a switch device 100 and a couple of capacitors C1, C2. The operational amplifier O1 has a non-inverting input terminal, an inverting input terminal, a non-inverting output terminal and an inverting output terminal.

The switch device 100 is driven by a clock signal CK and is able to apply at the non-inverting input terminal and the inverting input terminal of the operational amplifier O1 alternately a voltage reference Vref and the voltage Vs2 across the second resistance Rs2 or the voltage Vs1 across the first resistance Rs1 according to half of the time period of the clock signal CK. The clock signal is the chopper clock CK that, in each time period Tck, assume a high value during the half-period Tck1 and a low value during the half-period Tck2.

More particularly the switch device 100 comprises a switch S1 arranged in the electric path between the reference voltage Vref and the inverting terminal of the operational amplifier O1, a switch S2 arranged in the electric path between the reference voltage Vref and the non-inverting terminal of the operational amplifier O1, a switch S3 arranged in the electric path between the common terminal of the resistance Rs2 and the transistor M2 and the non-inverting terminal of the operational amplifier O1, a switch S4 arranged in the electric path between the common terminal of the resistance Rs1 and the transistor M1 and the inverting terminal of the operational amplifier O1.

Figure 4:
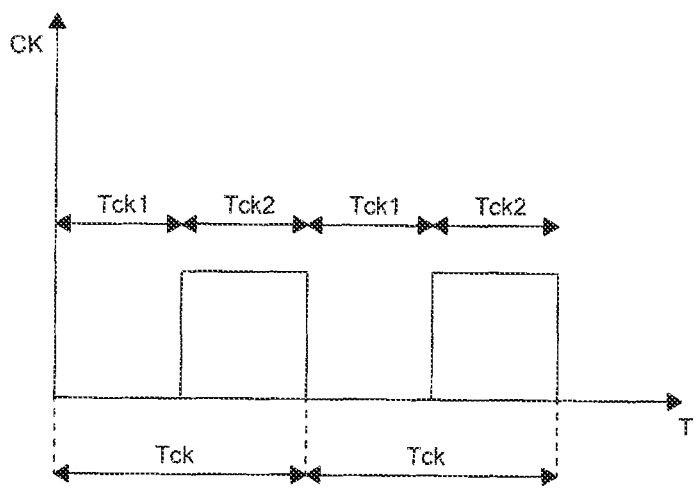
FIG. 4 shows a time diagram of the clock signal used in the current driver in FIG. 3.

As shown in FIG. 4, the clock signal CK for each time period Tck comprises the half-period Tck1 wherein the switches S2 and S4 are closed and the switches S1 and S3 are open and the half-period Tck2 wherein the switches S1 and S3 are closed and the switches S2 and S4 are open. In this way the voltage reference Vref and the voltage Vs2 or the voltage Vs1 are alternately applied at the non-inverting input terminal and the inverting input terminal of the operational amplifier O1 according to half time period of the clock signal CK.

Also the output signals OUT− and OUT+ respectively at the inverting output terminal and non-inverting output terminal of the operational amplifier O1, respectively, are applied to the first M1 and second M2 transistor, respectively, that is at the control terminals the first M1 and second M2 transistor, according to half-periods Tck1, Tck2 of the clock signal CK. More precisely the switches S6 and S5 are arranged in the electrical paths between the non-inverting output terminal and the inverting output terminal of the operational amplifier O1 and the control gates of the MOS transistors M1 and M2; during the half-period Tck1 the switch S6 is closed and the switch S5 is open while during the half-period Tck2 the switch S5 is closed and the switch S6 is open.

The current driver comprises storage means, preferably the capacitors C1 and C2, arranged to maintain on the first M1 or the second M2 transistor when not driven by the output signal OUT of the operational amplifier O1. The capacitors C1 and C2 are arranged respectively between the gate terminals of the transistors M1 and M2 and ground GND and are configured to maintain the transistor M1 or M2 turned on, by maintaining their gate-source voltage Vgs higher than the threshold voltage of the transistors M1 or M2, when the transistor is not driven by the output signals OUT− and OUT+ of the operational amplifier O1.

The sense resistances Rs1 and Rs2 must be have equal value, that is Rs1=Rs2=2*Rs.

During the half-period Tck1 the current I1 flowing through the resistance Rs1 is:

$$I1=(Vref-Voffset)/2*Rs$$

where Voffset is the offset voltage of the operational amplifier O1.

During the half-period Tck2 the current I2 flowing through the resistance Rs2 is:

$$I2=(Vref+Voffset)/2*Rs.$$

The capacitors C1 and C2 allows the transistors M1 and M2 to remain on during the half periods wherein one or the other transistors is not driven by the output signal OUT; during the time period T=Tck1+Tck2 the current Iout flowing through the LED diode D1 is:

$$I1+I2=(Vref-Voffset)2*Rs+(Vref+Voffset)\\2*Rs=Vref/Rs$$

that is the current Iout flowing through the LED diode D1 does not depend on the offset voltage Voffset of the operational amplifier O1.

Figure 5:
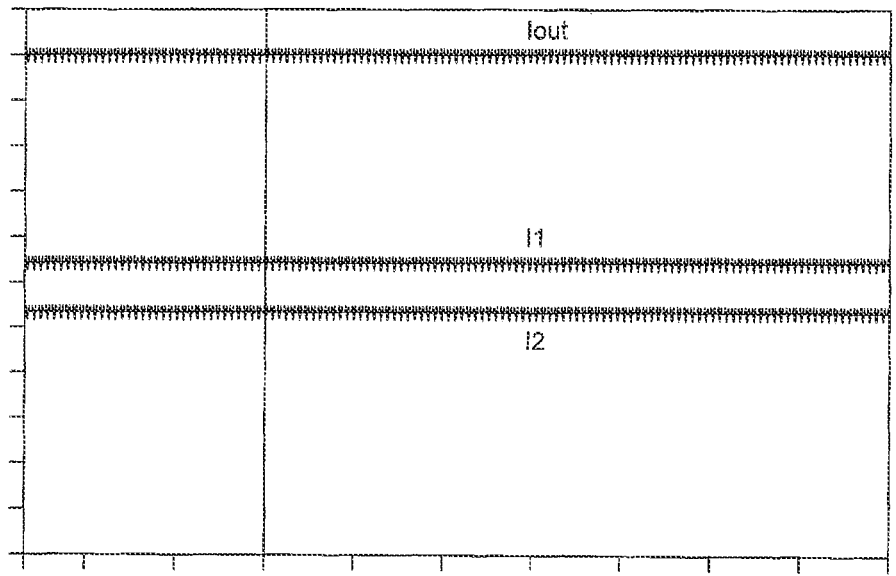
FIG. 5 shows the time diagrams of the currents I1, I2 and Iout.

FIG. 5 shows the time diagrams of the currents I1, I2 and Iout.

Figure 6:
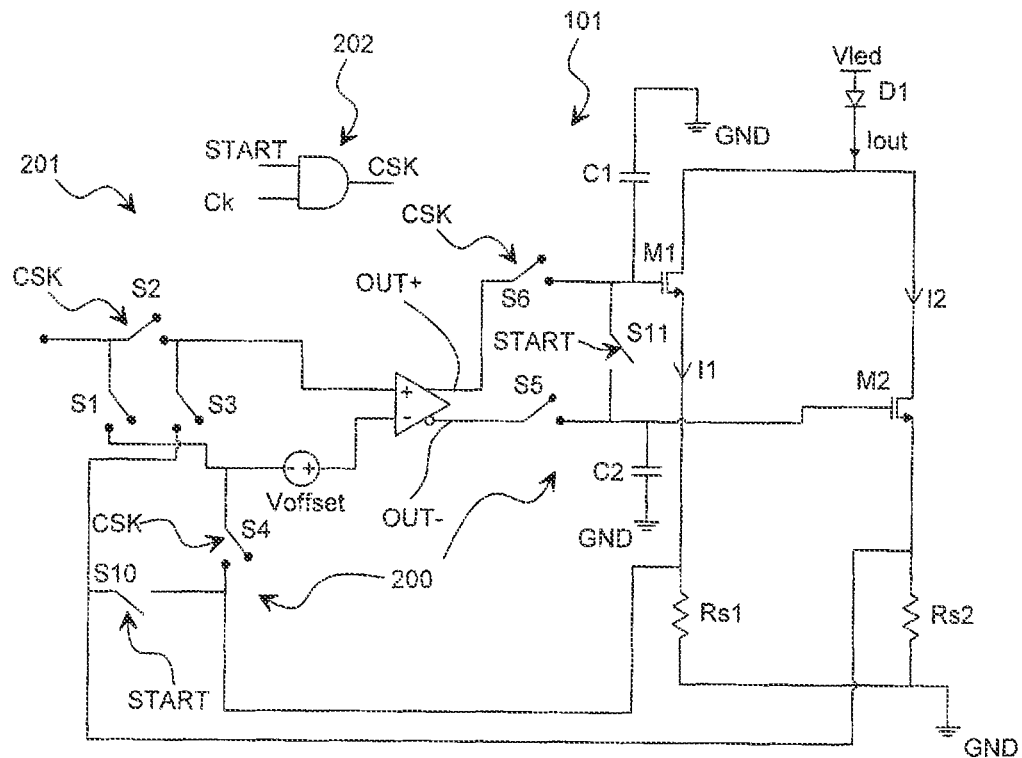
FIG. 6 shows a current driver for LED diodes according to a variant of the preferred embodiment of the present disclosure.

FIG. 6 shows a current driver for LED diodes according to a variant of the preferred embodiment of the present disclosure. This variant regards the circuit configuration of the current driver in FIG. 3 only at the start-up; in fact a further device 101 has been added to the current driver in FIG. 3 to pre-charge the storage capacitors C1, C2 to a voltage level close to the final one. For this reason, the current driver comprises another switch device 200 controlled by the control device 201. The switch device 200 comprises a switch S10 arranged between the terminals of the resistances Rs1 and Rs2 which are in common with the terminal of the transistor M1 and M2, and a another switch S11 arranged between the gate terminals of the transistors M1 and M2. The switches S2, S4 and S6 are controlled by the signal CSK deriving from and AND gate 202 having at the inputs the clock signal CK and the logic signal START which, at the start-up, is low (START=0) while the switches S10 and S11 are controlled by the signal START and are closed when the signal START is active at the start-up, that is when the signal START=0. Therefore only the switches S2, S4 and S6 may be closed together with the switches S10 and S11 at the start-up (when the signal START=0 and the signal CSK=0); in this way the capacitors C1 and C2 are pre-charged to a voltage level suitable to maintain on the transistors M1 and M2 when not driven by the output signal of the operational amplifier O1. When the signal START=1 the switches S10 and S11 are open and the signal CSK follows the waveform of the signal CK.

Figure 7:
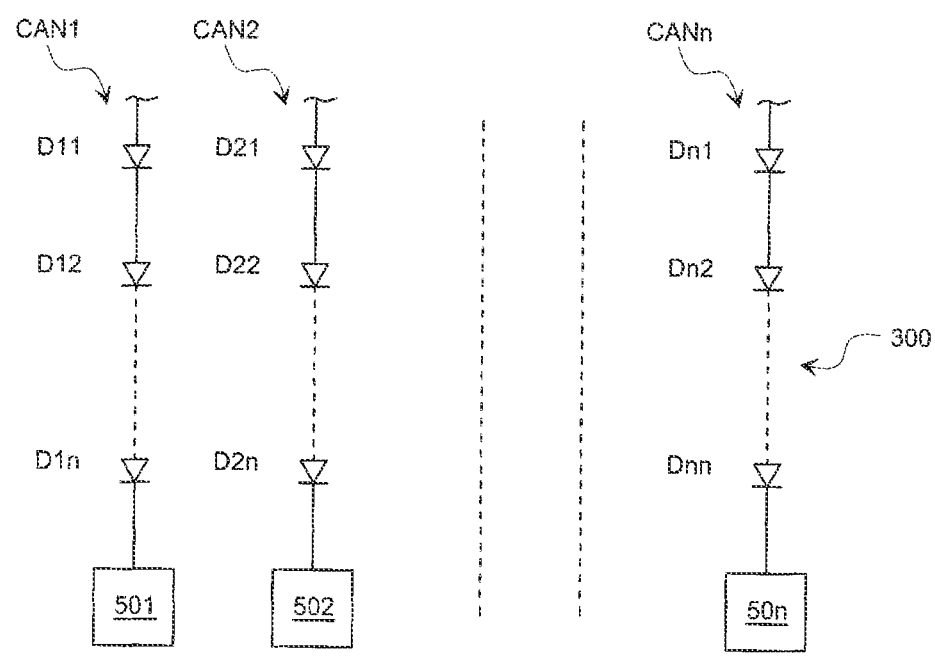
FIG. 7 is a schematic of a current driver for an array of LED diodes according to the present disclosure.

FIG. 7 is a schematic of an array 300 of LED diodes comprising a current driver device according to the present disclosure. The array of LED diodes comprises n channels CAN1 ... CANn formed by series of LED diodes D11 ... D1$n$, D21 ... D2$n$, Dn1 ... Dnn; the current driver device comprises for the channels CAN1 ... CANn a respective current driver 501, 502, ... 50$n$ and each of said current drivers 501, 502, ... 50$n$ is as the already disclosed current driver 50 and operates in the same way.

What is claimed is:

1. A current driver for an LED diode having a first terminal coupled to a supply node and having a second terminal, comprising:
   a first series connection of a first transistor and a first resistance,
   a second series connection of a second transistor and a second resistance,
   said first and second series connections being arranged in parallel to each other and directly connected between said second terminal of said LED diode and a voltage reference node,
   an operational amplifier, and
   a switch device driven by a clock signal and able to apply at a non-inverting input terminal and inverting input terminal of the operational amplifier alternately a reference voltage and a voltage across the first resistance or the voltage across the second resistance according to a half-period of the clock signal,
   said switch device configured to apply an output signal of the operational amplifier to the first and second transistor according to the half-period of the clock signal,
   a storage element arranged to maintain turned on the first and second transistors when not driven by the output signal of the operational amplifier.

2. The current driver according to claim 1, wherein said first and second resistances have equal value.

3. The current driver according to claim 1, wherein said storage element comprises a first and a second capacitor coupled between respective first and second control terminals of the first and second transistors and the voltage reference node.

4. The current driver according to claim 1, wherein the clock signal assumes a low level during a first half-period and a high level during a second half-period, the switch device configured:
   to apply at the non-inverting input terminal and the inverting input terminal of the operational amplifier the reference voltage and the voltage across the first resistance, respectively, and to apply the output signal at a non-inverting output of the operational amplifier to the first transistor during the first half-period of the clock signal, and
   to apply at the inverting input terminal and the non-inverting input terminal of the operational amplifier the reference voltage and the voltage across the second resistance, respectively, and to apply the output signal at an inverting output of the operational amplifier to the second transistor during the second half-period of the clock signal.

5. The current driver according to claim 1, wherein the current driver comprises a start device configured to precharge the storage element at start-up.

6. The current driver according to claim 5, wherein said start device comprises another switch device configured to apply both voltages across the first and second resistances at the inverting input terminal of the operational amplifier, the reference voltage at the non-inverting input terminal of the operational amplifier and the output signal of the operational amplifier at the storage element, said another switch device controlled by a start signal active only at start-up while the switch device is controlled by the signal at the output from a logic AND gate receiving at inputs the clock signal and the start signal.

7. The current driver according to claim 5, wherein the storage element comprises a first and a second capacitor coupled between respective first and second control terminals of the first and second transistors and the voltage reference node, the operational amplifier comprising an inverting output terminal and a non-inverting output terminal, the output signal at the non-inverting output terminal being applied to both the first and second capacitor at start-up.

8. A circuit, comprising:
   a load circuit coupled between a supply node and an intermediate node;
   a first series connection of a first transistor and a first resistance coupled between said intermediate node and a reference node;
   a second series connection of a second transistor and a second resistance coupled between the intermediate node and the reference node;
   an operational amplifier having a first output node and a second output node;
   a first switch configured to selectively couple the first output node to a first control terminal of the first transistor;
   a second switch configured to selectively couple the second output node to a second control terminal of the second transistor; and
   a clock signal configured to alternately actuate the first and second switches.

9. The circuit of claim 8, wherein the load circuit comprises a plurality of series connected LEDs.

10. The circuit of claim 8, wherein the operational amplifier comprises a first input and a second input, the circuit further comprising:
    a third switch configured to selectively couple a voltage across the first resistor to the first input of the operational amplifier; and
    a fourth switch configured to selectively couple a voltage across the second resistor to the second input of the operational amplifier;
    wherein the clock signal is further configured to alternately actuate the third and fourth switches.

11. The circuit of claim 10, further comprising an input node configured to receive a reference voltage, the circuit further comprising:
    a fifth switch configured to selectively couple the reference voltage to the first input of the operational amplifier; and
    a sixth switch configured to selectively couple the reference voltage to the second input of the operational amplifier;
    wherein the clock signal is further configured to alternately actuate the fifth and sixth switches.

12. The circuit of claim 8, wherein the operational amplifier comprises a first input and a second input, the circuit further comprising:
    a first start-up switch configured to selectively couple the first input to the second input; and
    a second start-up switch configured to selectively couple the first control terminal of the first transistor to the second control terminal of the second transistor.

13. The circuit of claim 12, further comprising a circuit configured to control said first switch and second switch to couple the first and second output nodes of the operational amplifier simultaneously to both the first control terminal of the first transistor and the second control terminal of the second transistor during start-up.

14. A current driver device for a plurality of series connected LEDs coupled between a supply node and an intermediate node, said current driver device comprising a current driver circuit comprising:
    a first series connection of a first transistor and a first resistance, a second series connection of a second transistor and a second resistance, said first and second series connections being arranged in parallel to each other and directly connected between the intermediate node and a voltage reference node, an operational amplifier, and a switch device driven by a clock signal and able to apply at a non-inverting input terminal and inverting input terminal of the operational amplifier alternately a reference voltage and a voltage across the first resistance or the voltage across the second resistance according to a half-period of the clock signal, said switch device configured to apply an output signal of the operational amplifier alternately to the first and second transistor according to the half-period of the clock signal, a storage element arranged to maintain turned on the first and second transistors when not driven by the output signal of the operational amplifier.

* * * * *